US008128220B2

(12) United States Patent
Montagner

(10) Patent No.: US 8,128,220 B2
(45) **Date of Patent: *Mar. 6, 2012**

(54) ELASTIC MINIATURIZED HINGE FOR A FLEXIBLE TEMPLE ELEMENT OF GLASSES

(75) Inventor: Luciano Montagner, Susegana (IT)

(73) Assignee: Ideal SRL, Quero (BL) (IT)

( * ) Notice: Subject to any disclaimer, the term of this patent is extended or adjusted under 35 U.S.C. 154(b) by 369 days.

This patent is subject to a terminal disclaimer.

(21) Appl. No.: 12/369,601

(22) Filed: Feb. 11, 2009

(65) Prior Publication Data

US 2009/0284711 A1 Nov. 19, 2009

(30) Foreign Application Priority Data

May 14, 2008 (IT) .............................. TV2008A0071

(51) Int. Cl.
*G02C 5/22* (2006.01)

(52) U.S. Cl. ........................... 351/153; 351/113; 16/228

(58) Field of Classification Search .................. 351/153, 351/113, 114, 41, 111, 158; 16/228
See application file for complete search history.

(56) References Cited

U.S. PATENT DOCUMENTS 6,631,194 B2 * 10/2003 Fukuoka ....................... 381/113

FOREIGN PATENT DOCUMENTS

| | | |
|---|---|---|
| EP | 0679920 | 11/1995 |
| FR | 2702573 | 9/1994 |
| IT | 1288611 | 10/1997 |

* cited by examiner

*Primary Examiner* — Hung Dang
(74) *Attorney, Agent, or Firm* — Egbert Law Offices PLLC

(57) ABSTRACT

The present invention is an elastic miniaturized hinge for flex temples with an articulation trolley provided at least with a seat for the housing of the spring. A box is placed along the temple of the glasses. A housing along the box contains an articulation trolley. The articulation trolley includes at least one spring and is contained inside of the box, while the portion that includes the articulation exits from the front end of the box. The tie-rod body of the articulation is provided with a base, being provided with at least one seat that houses the rear end of the corresponding spring. Peripherally with respect to the opening of the housing, at least one guiding zone is obtained. Furthermore, the protrusion is provided with a guiding seat with an opening along the front profile and longitudinally projected with respect to the sliding longitudinal axis of the articulation trolley.

3 Claims, 1 Drawing Sheet

ELASTIC MINIATURIZED HINGE FOR A FLEXIBLE TEMPLE ELEMENT OF GLASSES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention relates to an elastic miniaturized hinge for a flexible temple element with an articulation trolley provided with at least a housing seat for a spring.

The invention, finds particular even if not exclusive application, in the field of the production of components for flexible temple elements, or so-called “flex-temples” for frames of glasses and in the metallic small items for related hinges.

2. Description of Related Art Including Information Disclosed Under 37 CFR 1.97 and 37 CFR 1.98

The temples of glasses frames, on their ends and at the opposite side with respect to the terminating ends thereof, are provided with associated elasticized hinges, which are each flexible temple elements called a “flex”. This flex or elastic hinge allows engagement with an elasticized function to that part of the front of the glasses, properly called a lug. The predominant turnover or extra-opening of the temple element’s function, also called a “flex-temple”, is obtained on both sides of the glasses and creates the advantage of conferring a greater fit, resulting in more wearable glasses and more adaptable glasses to the different anatomical conformations of each person. Moreover, the present invention allows for an effective absorption action of accidental impacts, avoiding excessive stress on both of the otherwise utilizable hinges and the corresponding temples placed on the sides of the glasses.

Today, the most spread elastic hinges look substantially complex, requiring excessive sizes in the components, which collides with the present tendency to minimize the sizes themselves in order to make the frame of the glasses more charming, with lower visual impact and lower weight.

The now-mentioned circumstances have therefore induced the companies of the sector to reach to the implementation of elastic hinges, which tend toward an improvement in functionality, though being more reduced in size and aiming, at the same time, to reduce the components, facilitating their assembly, and reducing the costs.

The research of size reduction produced a series of size clearances and physiological conditions, such as rotation clearances of the temples in the opened or closed position, during the extra-opening movement, and vertical translation clearances of the temples in any working position of the glasses.

FR2702573 (Chevassus), describes an elastic hinge. A box is included in it, inside of which a tie-rod is axially movable, one end of which is hingeable to the lug of the glasses, and one opposite end of which ends with a perpendicular section to form a shoulder. In this way, a tie-rod is obtained, inside the box, provided with a longitudinal seat which houses a compression spring, one end of which is placed in abutment with said shoulder, while the opposite end, is arranged in abutment with a second striker, obtained at the end of a guiding rod coaxially introduced in said spring. The guiding rod, on the opposite side, is provided with a particular wedge-shaped head, intended to be butted in a corresponding receptacle obtained by a second portion, which is longitudinally developed and integral with the tie-rod. This portion is provided along one side with a spike which, being protruding towards the intrados of the box, during the assembly, engages in one corresponding seat, realizing a stable constraint between the tie-rod and the box in order to prevent the extraction of said tie-rod.

IT1288611 (Montagner), is an elastic hinge for glasses temples, essentially comprising a box, being associated, when finished, to the temple by means of a tacking and preassembly, inside of which two springs are housed. The springs, on one side with their ends, are in abutment to the bottom of the box, and on the other side, the springs are arranged in abutment to the end of a tie-rod, to which they are arranged one for each side. The shape of the tie-rod is substantially “T” shaped provided at the opposite end with a convenient hole, being hingeable to a corresponding lug provided on the frame of the glasses.

EP0679920 (OBE-Werk), provides three solutions for elastic hinges. A first one is characterized by the presence of a tie-rod coaxial to a spring, placed axially with respect to a box opened along one side, on the end of said tie-rod means being ensured acting as rabbet for an end of a compression-spring. The opposed end of the aforementioned spring engages at a shoulder obtained inside of the box, in such a way that, during the application of the tie-rod in the room of the same, the spring is submitted to a precompression and held in this condition. A second provision consists in the providing the monolithic realization of the tie-rod and with a “L” shape, which, in the intermediate position, holds the related spring during the assembling in the obtained housing and similarly holds the related spring in a precompression condition. Finally, a third tie-rod solution is recalled, always of the monolithic type. The latter, apart from the traditional flat head of the hinge, provided with a related hole, provides a body, having a quadrilateral section, or longitudinally protruding shank ending with a transverse portion. Some particular springs are obtained perpendicularly developing on the sides, that is along the sides of said shank, and integral with the same, said springs being obtained from a plate whose shape looks like an undulated sequence.

In US2006179609 (Huang), a hinge is described in which the trolley, sliding inside of the box, includes a tie-rod that is coaxial to the helicoidal compression spring, which at the rear end engages a bell-socket in whose seat the rear end of the compression-spring is housed.

The company Comotec, www.comotec.com proposes a hinge model called Optimum Flex, which suggests a box with a prolongation along one side to constitute a protrusion insinuated between the two walls of the lug joined to the front of the glasses. It looks like it is a device substantially conceived to avoid the torsional oscillations of the hinge in working conditions of the articulation.

It is therefore reasonable to consider known the elastic hinge that includes:

a box, along the temple or lug of the glasses;

a housing along the box containing the articulation trolley;

the articulation trolley, which includes at least one spring and is housed inside of the box, while the portion including the articulation exits from the front end of the box;

the articulation trolley including a bell-socket seat able to contain the rear end of the spring of the trolley, said seat being screwed at the end of the tie-rod body;

a corresponding lug seat, obtained on the front of the glasses, to which the articulation is hinged.

The described solutions, particularly with reference to the overall length of the hinge, still look like they have generous sizes, requiring, still to be less visible, an additional container of the same.

Furthermore, corresponding to the articulation, the existing hinges can originate a series of clearances and slacks, being rotation clearances, e.g. in the opened or closed position, or during the extra-opening movement, as well as vertical translation clearances in any working position.

An aim of this invention is also to avoid the above-mentioned drawbacks.

BRIEF SUMMARY OF THE INVENTION

This and other aims, are reached by the present invention according to the characteristics of the included claims, solving the abovementioned problems by means of an elastic miniaturized hinge for flex temples with an articulation trolley provided at least with a seat for the housing of the spring, including:

a box, along the temple of the glasses; and a housing along the box containing the articulation trolley;

wherein the articulation trolley includes at least one spring and is contained inside of the box, while the portion that includes the articulation exits from the front end of the box; and wherein the tie-rod body of the articulation is provided with a base which, at least on one side, is orthogonally projected with respect to the body of the tie-rod. The base is provided with at least one seat that houses the rear end of the corresponding spring, where said spring is partially positioned against with respect to said body of the tie-rod. Peripherally with respect to the opening of the housing obtained at the front end of the box, at least one guiding zone is obtained, said guiding zone consisting of at least one cheek of a protrusion longitudinally projected with respect to the box, where said cheek is parallel and oriented toward at least one of two lateral sides of the articulation. Furthermore, the protrusion is provided with a guiding seat with opening along the front profile and longitudinally projected with respect to the sliding longitudinal axis of the articulation trolley.

In this way, by means of the considerable creative contribution which effect constitutes an immediate technical progress, different aims and advantages are achieved.

A first aim consists in the reduction of the length of the box, and therefore keeping down the total size of the hinge.

The connecting element that can be a screw, a stud, or a pin, is guided by the guiding zones/seats, located on the box.

The guiding seats allow easier insertion in the system itself. For example, in the traditional system with a screw, its insertion results simplified.

Possible elimination of the seat avoids the axial rotation of the articulation, because this seat is replaced by the guiding system.

There is greater resistance of the system in the closing, opening and extra-opening movement, as the system allows to have the sliding elements guided in any position.

There is greater resistance to the side bendings for the same reasons of the previous point.

Application is possible on products of any size, even large sizes, because, unlike the mechanisms at present on the market, increasing the height of the product corresponds, to the same extent, to increasing precision of the mechanism.

It is possible to avoid having to leave the articulation slide on a contacting surface, as is sometimes present in order to contain the clearances, because the guiding system makes its realization superfluous.

It is possible to use the guiding zones as contact points to limit the strokes, both, the opening, the closing and the extra-opening strokes.

It is possible to use the guiding zones for the housing of springs, studs or related seats, in order to have a considerable reduction of the size of the hinge.

The guiding zones may also not be in contact with the articulation, e.g. obtaining four tongues on the external element, being it both the hinge, the lug, the temple or another one.

These and other advantages will appear from the following detailed description of a preferred embodiment with the aid of the enclosed schematic drawings whose embodiment details are not to be considered limiting but only illustrative.

DETAILED DESCRIPTION OF THE INVENTION

Figure 1:
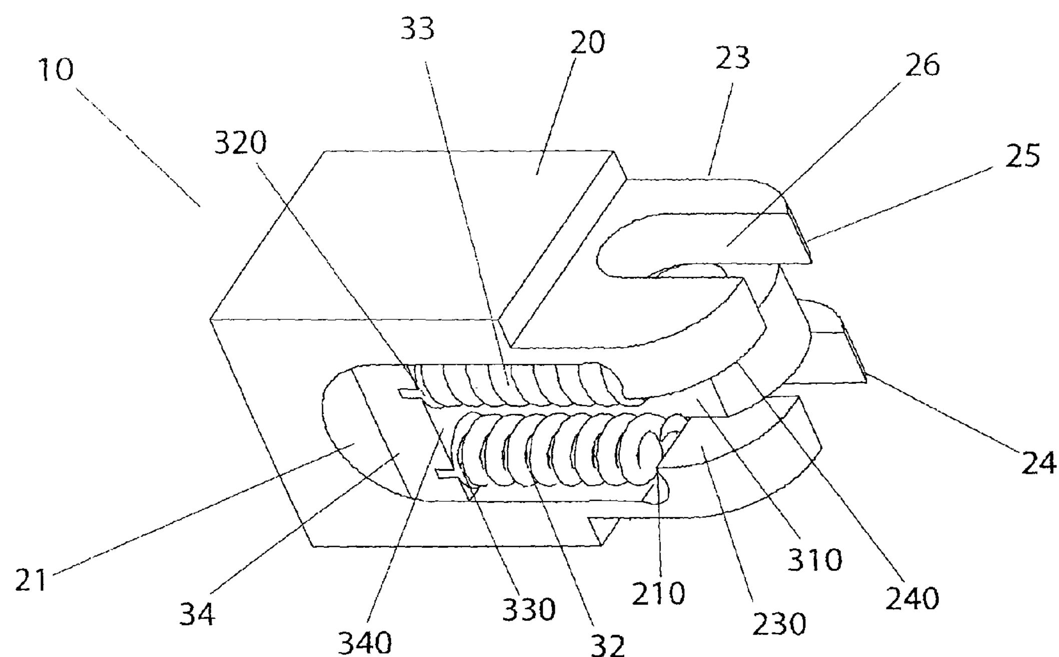
FIG. 1 represents a perspective view of an assembled elastic hinge of the present invention from the bottom.
Figure 2:
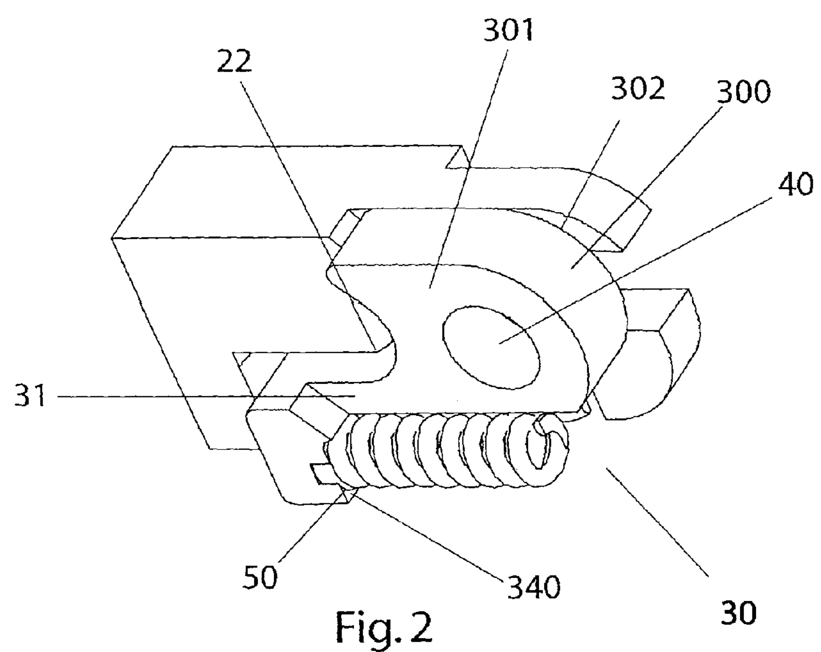
FIG. 2 represents a partial perspective view from the bottom of the hinge of FIG. 1.

The elastic hinge (10) (FIG. 1), to make a flexible flex temple, in a frame for glasses, is composed of a box (20), having a sidelong opened, and a housing (21), inside of the housing (21) containing the trolley (30) of the articulation (300). The box (20) at the front part is provided with an opening (22) through which the articulation (300) of the trolley (30) exits, and from the sides of which two parallel protrusions (23, 24) longitudinally protract. Each protrusion (23, 24) of the box (20) presents a guiding zone, that in this case includes two internal cheeks (230, 240) the one facing the other, among which, in a hinge mounted condition (10), the two parallel and opposite flat faces (301, 302) of the articulation (300) (FIG. 2) are arranged. In a hinge (10) mounted condition, each flat face (301, 302) looks towards and is positioned against the corresponding cheek (230, 240).

In a further embodiment a self-lubricating element with a low friction coefficient may be interposed between the flat face (301, 302) and the corresponding cheek (230, 240). Furthermore, one can observe that each protrusion (23, 24) is provided with a channel-shaped guiding seat (26) or slot-shaped guiding seat which is longitudinally projected with respect to the sliding longitudinal axis the of the trolley (30) of the articulation (300). In one case, the guiding seat (26) could also be closed, e.g. a hole. More in detail, each protrusion (23, 24) has the guiding seat (26) with the opening obtained along the front border (25). In a hinge (10) condition with the trolley (30) of the articulation (300) assembled (FIG. 1), the articulation (300) is interposed between the two protrusions (23, 24), in such a way that the through-hole (40) corresponds to the guiding seats (26) of the two protrusions (23, 24).

The trolley (30) of the articulation (300) (FIG. 2), is of the type made of a tie-rod body (31) with a rectilinear development and with at the rear end a "T" shaped orthogonal base (34) to the sides of which two compression springs (32, 33) are arranged. Each of the springs (32, 33) is arranged with the rear end (320, 330) inside of a corresponding circular seat (50), consisting of a blind hole, obtained in correspondence of said orthogonal base (34). The orthogonal base (34) is provided with a flat portion (340) protruding with respect to the profile (310) of the tie-rod body (31), and in correspondence of which flat portion (340) two blind holes are obtained corresponding to the two circular seats (40), one for each rear end (320, 330) of the spring (32, 33). In this way the springs (32, 33) are disposed in parallel and partially positioned against and below the profile (310) of the tie-rod body (31), in a condition in which one lays near to the other.

REFERENCE (10) elastic hinge
(20) box
(21) housing
(30) trolley
(300) articulation
(22) opening
(23, 24) protrusions
(230, 240) internal cheeks
(301, 302) flat faces
(26) Channel-shaped guiding seat
(25) front border
(40) through-hole
(50) circular seat
(31) tie-rod body
(32, 33) compression springs
(310) profile of the tie-rod body
(210) internal wall
(320, 330) rearward end
(340) flat portion
(34) orthogonal base
(310) profile

I claim:

1. An elastic miniaturized hinge for use with a temple of eyeglasses, the hinge comprising:

a box suitable for affixing to the temple or a lug of the eyeglasses;

a housing extending along an interior of said box;

a trolley contained within said housing, said trolley having an articulation at one end thereof;

at least one spring contained in said box, the spring bearing against said trolley and against said interior of said box, said box having an open end, said articulation extending outwardly of said open end of said box, said trolley having a tie-rod body with a base projecting orthogonally therefrom at an end thereof interior of said housing, said base having at least one seat formed in a surface thereof, the seat housing an end of said at least one spring; and a guiding zone formed at said opening of said housing, said guiding zone having a first protrusion and a second protrusion in generally spaced parallel relationship to each other and extending longitudinally outwardly therefrom, said first protrusion having a cheek facing a cheek of said second protrusion, said articulation having a first lateral face and a second lateral face on opposite sides thereof, said first lateral face being adjacent to and in sliding relation with said cheek of said first protrusion, said second lateral face being adjacent to and in said sliding relation with said cheek of said second protrusion, each said first and second protrusions having a guiding seat formed therein.

2. The hinge of claim 1, said seat of said base being a circular seat.

3. The hinge of claim 1, said box and said end of tie-rod body having a T-shape, said base having a first surface on one side of said tie-rod body and a second surface on an opposite side of said tie-rod body, said housing having an internal wall, said at least one spring comprising:

a first compression spring bearing against said first surface of said base and against said internal wall of said housing; and a second compression spring bearing against said second surface of said base and against said internal wall of said housing.

* * * * *